Feb. 7, 1933. G. J. MEYER ET AL 1,896,639
AUTOMATIC BOX LOADER
Filed May 2, 1929 3 Sheets-Sheet 1

WITNESSES

INVENTORS

ATTORNEY

Feb. 7, 1933.   G. J. MEYER ET AL   1,896,639
AUTOMATIC BOX LOADER
Filed May 2, 1929   3 Sheets-Sheet 3

WITNESSES

INVENTORS

Patented Feb. 7, 1933

1,896,639

UNITED STATES PATENT OFFICE

GEORGE J. MEYER, OF MILWAUKEE, WISCONSIN, AND GERHARDT J. PATITZ, OF PEEKSKILL, NEW YORK, ASSIGNORS TO GEO. J. MEYER MANUFACTURING COMPANY, OF CUDAHY, WISCONSIN, A CORPORATION OF WISCONSIN

AUTOMATIC BOX LOADER

Application filed May 2, 1929. Serial No. 359,886.

The invention relates to an automatic box loading device for loading containers, more particularly filled bottles, into a crate.

One of the objects of the invention is to provide a machine in which the series of pockets in a row in a crate are loaded with containers at the same time after which the crate is fed forward so that another row of pockets may be filled.

Another object of this invention is to feed several containers at a time into position where they may be released and allowed to drop into a row of pockets in the crate and by the successive feed of rows of containers and the forward movement of the crate automatically load the crate.

The invention further consists in the several features hereinafter set forth and more particularly defined by claims at the conclusion hereof.

Figure 1:
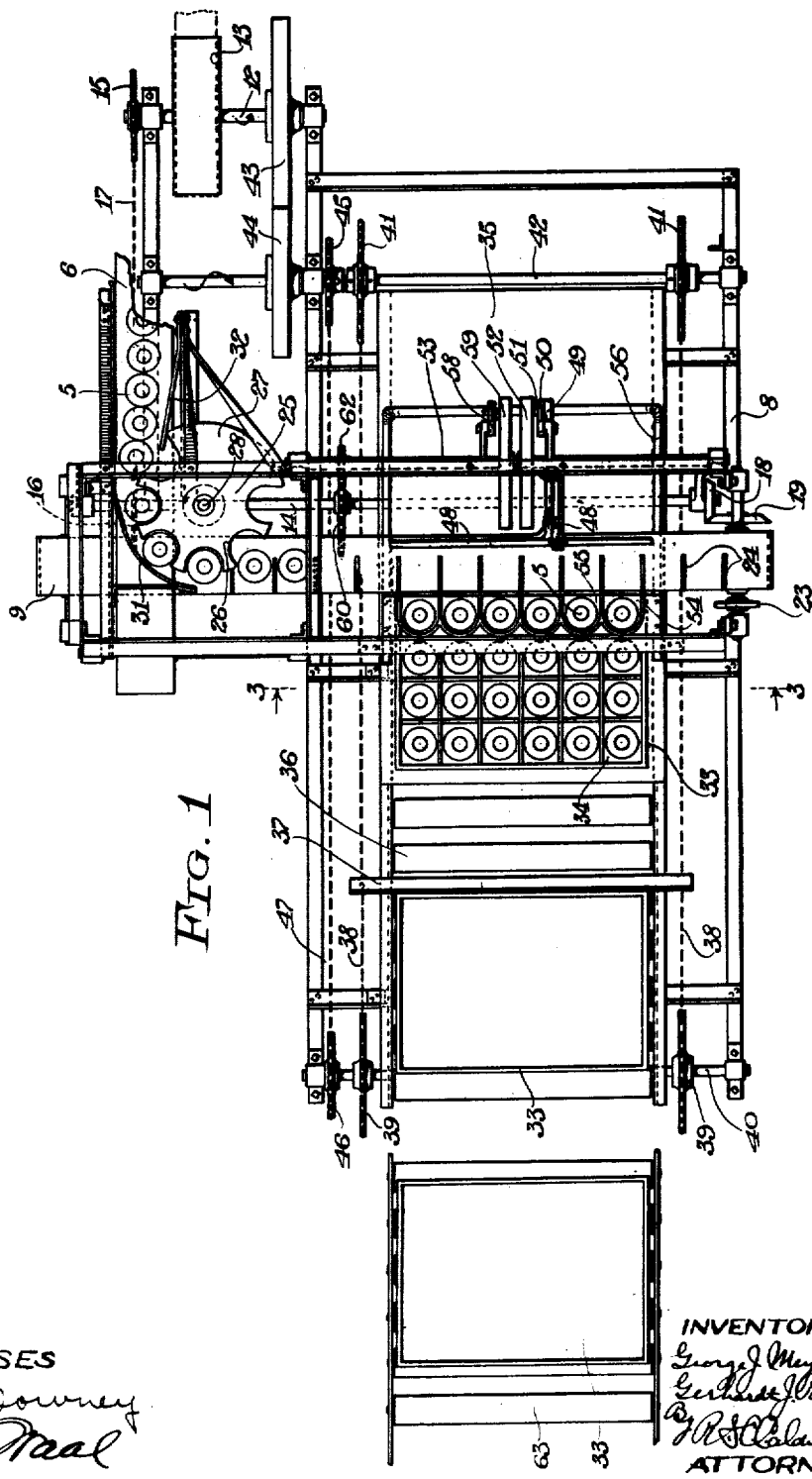
Figure 2:
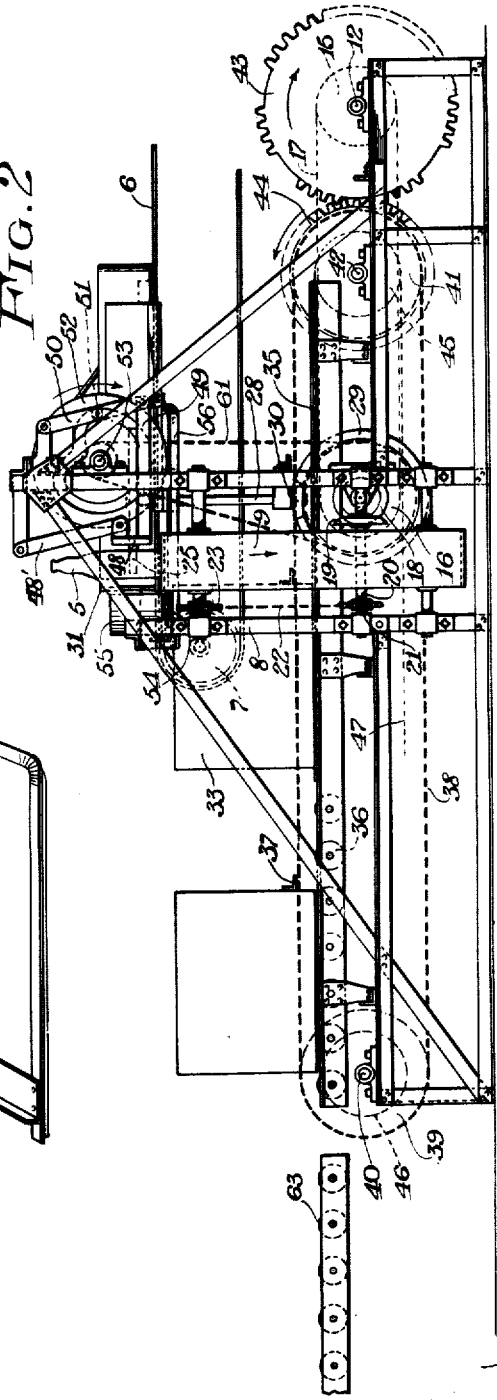
Figure 3:
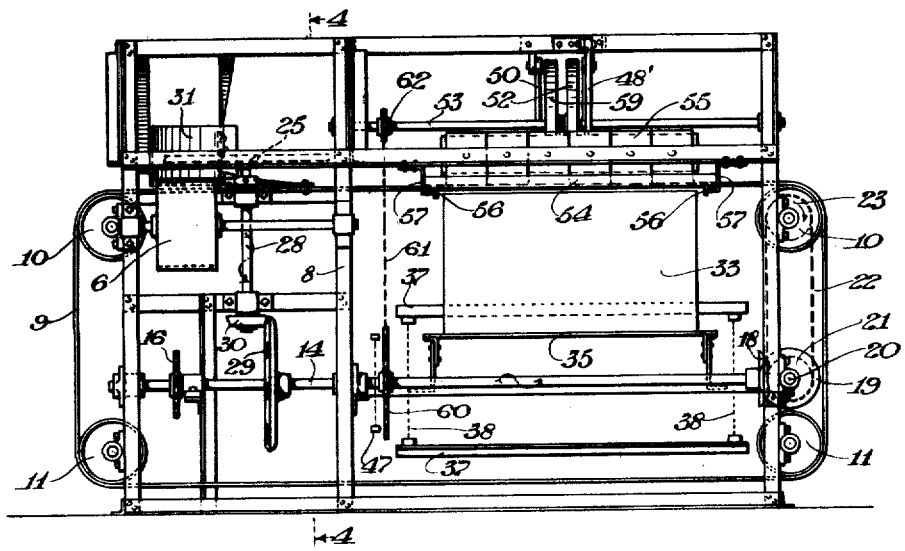
Figure 4:
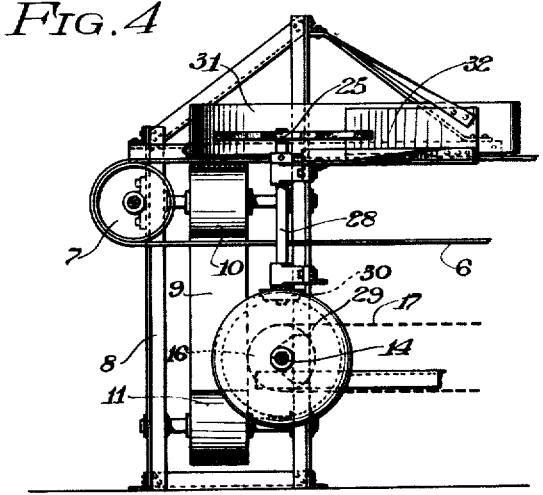

In the drawings: Fig. 1 is a plan view of a machine embodying the invention; Fig. 2 is a side view of the machine; Fig. 3 is a section taken on the line 3—3 of Fig. 1; Fig. 4 is a detail sectional view taken on the line 4—4 of Fig. 3; Fig. 5 is a detail view of the release slide.

The bottles or containers 5 are fed to the machine upon an endless belt 6 which at one end runs over a pulley 7 mounted on the frame 8 of the machine. This feed belt runs at right angles to a second feed belt 9 running over upper pulleys 10 and lower pulleys 11.

The feed belts 6 and 9 are driven continuously, the belt 9 being driven faster than the belt 6. The drive for the belt 9 is from a drive shaft 12 carrying a drive pulley 13 and connected to a shaft 14 through sprockets 15 and 16 and chain 17, the shaft 14 carrying a bevel gear 18 meshing with a bevel gear 19 on a shaft 20 carrying a sprocket 21 connected by a chain 22 to a sprocket 23 on a shaft carrying one of the pulleys 10.

The belt 9 is provided with a plurality of spaced ribs 24 between which the containers are fed, although in many instances these ribs may be omitted. The bottles from the feed belt 6 are transferred to the belt 9 by means of a turret 25 having bottle engaging notches 26 and a plain sector 27. This turret is mounted on an upright shaft 28 intermittently driven from the shaft 14 by means of a mutilated bevel gear 29 on the shaft 24 and a bevel gear 30 on the shaft 28. As the turret turns, the bottles on the belt 6 are successively deposited in the notches in the turret, being compelled to take their position by the curved guide plate 31. By means of this turret a predetermined number of bottles are fed in a row onto the belt 9, the feed of other bottles being stopped for a time by a spring finger 32 which is moved into the path of the bottles on the belt 6 by the cam action of the sector 27. Thus the turret transfers a predetermined number of containers from the belt 6 to the belt 9, the containers being disposed in a row on the belt 9 between the ribs 24.

The belt 9 then carries the containers to a position above a shipping box or crate 33 having a plurality of pockets 34 arranged in rows, each pocket being designed to receive one of the containers.

The crates 33 are placed upon a table 35 and are moved along the same and over conveyor rollers 36 by means of push bars 37 carried by endless chains 38, each chain running over sprockets 39 on a drive shaft 40 and over sprockets 41 loosely mounted on a shaft 42. The crate is intermittently advanced along the table by an intermittent drive connecting the shaft 12 with the shaft 40 consisting of a mutilated gear 43 on shaft 12 meshing with a gear 44 on shaft 42 which is connected to shaft 40 by sprockets 45 and 46 and a chain 47. The intermittent drive for the conveyer formed by bars 37 and chains 38 is designed to advance the crate along the table until a row of pockets in the crate is below and slightly in advance of the belt 9 so that a row of containers advancing with said belt may be removed therefrom and dropped in the pockets in the crate.

Each row of containers is removed from the belt 9 by an intermittently reciprocated push bar 48. This bar has a rearwardly extending arm 49 pivotally connected to a cam follower 50 swingingly suspended from the frame of the machine. The follower 50 carries a roller 51 running in a slotted cam 52 upon a shaft 53. At its forward end the bar 48 is pivotally connected to a link 48' swingingly suspended from the frame of the machine and cooperating with the follower to impart substantially straight line reciprocation to the bar 48. The movement of the follower by the cam causes a quick reciprocation of the bar 48 at certain intervals whereby the containers are moved onto a support 54.

The support 54 forms at intervals the bottom for a series of pockets 55 open at one side and is mounted on a frame 56 slidably mounted in guides 57 secured to the frame of the machine. This frame 56 is reciprocated at intervals by a follower 58 swingingly suspended from the frame of the machine and having a roller running in the groove of a cam 59 on the shaft 53. The cam is designed to move the support 54 out from under the pockets 55 after the containers have been pushed by the bar 48 from the belt 9 and into the pockets. This movement of the support 54 causes the row of bottles in the pockets 55 to drop down into a row of pockets in the crate then in a position to receive them, after which another row of bottles advanced by the belt 9 is dropped into the next row of pockets in the crates, which operation is repeated until the crate is filled. The shaft 53 is driven from the shaft 14 by a sprocket 60 on shaft 14 connected by a chain 61 to a sprocket 62 on the shaft 53.

After the crate is filled it is advanced over the rollers 36 and then onto a roller conveyer 63.

The operation in brief is as follows: Six bottles are transferred from the belt 6 onto the belt 9 and carried thereby to a position adjacent the support 54 and are pushed off said belt 9 onto said support. The support 54 moves out from under the bottles which are prevented from moving with it by the walls of the pockets 55 and consequently the bottles drop down into a row of pockets in the shipping box then in line with the pockets 55. Thereafter the crate moves ahead to bring another row of pockets into line with the pockets 55 and another row of bottles is allowed to drop into them. In this way the crate is filled and the other crates are filled in a similar manner and are conveyed away from the machine by the delivery conveyer 63. The mutilated turret or star wheel 25 is driven continuously for a time interval sufficient to load each crate, but is stopped momentarily at regular intervals, by the intermittent drive hereinbefore described, to permit the succeeding empty crates to reach the loading position.

We desire it to be understood that this invention is not limited to any specific form or arrangement of parts except in so far as such limitations are specified in the claims.

What we claim as new and desire to secure by Letters Patent is:

1. In a box loading machine, the combination of feed belts running at an angle to each other, a notched turret for transferring a predetermined number of bottles one at a time from one belt to another, means for stopping the other bottles advancing on the first belt, means for feeding a box below the upper run of the second belt, and means for removing the predetermined number of bottles from said second belt and depositing them in an aligned row of pockets in the box.

2. The combination of a conveyor, a star wheel for feeding containers onto said conveyor in spaced relation and having a notched portion and an inactive portion for feeding said spaced containers in spaced successive rows, and means for moving said spaced containers from said conveyor.

3. The combination of a pair of container-receiving conveyors, means distinct from the containers for transferring containers from one conveyor to the other and for depositing said containers on the second conveyor in spaced relation and in successive endwise spaced rows, the spacing of the endwise rows being greater than the spacing of the containers in each row, and means for moving said spaced containers from said second conveyor.

4. The combination of a conveyor, and means including a rotary turret for feeding containers onto said conveyor in spaced relation, said turret having a notched portion and an inactive portion for feeding said spaced containers in spaced successive rows.

5. The combination of a conveyor, rotary impelling means for feeding rows of successive containers to said conveyor, and means co-operating with said rotary means for periodically interrupting the feed of containers to said conveyor at the end of each row.

6. The combination of means for feeding a box, a conveyor movable above said box transversely of the line of travel of said box, means for feeding containers onto said conveyor in successive endwise spaced rows and for arranging the containers in each row closer than the endwise spacing between said rows, and means for successively shifting said rows of containers laterally from said conveyor and into said box.

7. The combination of a conveyor, and rotary impelling means for feeding containers onto said conveyor in successive endwise spaced rows and for arranging the containers in each row closer than the endwise spacing between said rows.

8. The combination of a pair of conveyors, and means including a rotary member having container-impelling portions for feeding a series of successive containers between said conveyors and having other portions for periodically interrupting the feeding of containers to terminate said series.

9. The combination of a conveyor, a star wheel for positioning rows of articles on said conveyor, means for positively driving and timing the operation of the star wheel, and means for periodically interrupting the positioning of articles of the conveyor by the star wheel for separating the rows.

In testimony whereof, we affix our signatures.

GEORGE J. MEYER.
GERHARDT J. PATITZ.

CERTIFICATE OF CORRECTION.

Patent No. 1,896,639.   February 7, 1933.

GEORGE J. MEYER, ET AL.

It is hereby certified that error appears in the printed specification of the above numbered patent requiring correction as follows: Page 2, line 92, claim 3, strike out the word "endwise" and insert the same before "spacing" in same line and claim; page 3, line 8, claim 9, for "of" second occurrence read "on" and that the said Letters Patent should be read with this correction therein that the same may conform to the record of the case in the Patent Office.

Signed and sealed this 28th day of March, A. D. 1933.

(Seal)   Acting Commissioner of Patents.

riodically interrupting the feeding of containers to terminate said series.

9. The combination of a conveyor, a star wheel for positioning rows of articles on said conveyor, means for positively driving and timing the operation of the star wheel, and means for periodically interrupting the positioning of articles of the conveyor by the star wheel for separating the rows.

In testimony whereof, we affix our signatures.

GEORGE J. MEYER.
GERHARDT J. PATITZ.

CERTIFICATE OF CORRECTION.

Patent No. 1,896,639.            February 7, 1933.

GEORGE J. MEYER, ET AL.

It is hereby certified that error appears in the printed specification of the above numbered patent requiring correction as follows: Page 2, line 92, claim 3, strike out the word "endwise" and insert the same before "spacing" in same line and claim; page 3, line 8, claim 9, for "of" second occurrence read "on" and that the said Letters Patent should be read with this correction therein that the same may conform to the record of the case in the Patent Office.

Signed and sealed this 28th day of March, A. D. 1933.

(Seal)            Acting Commissioner of Patents.

CERTIFICATE OF CORRECTION.

Patent No. 1,896,639.  February 7, 1933.

GEORGE J. MEYER, ET AL.

It is hereby certified that error appears in the printed specification of the above numbered patent requiring correction as follows: Page 2, line 92, claim 3, strike out the word "endwise" and insert the same before "spacing" in same line and claim; page 3, line 8, claim 9, for "of" second occurrence read "on" and that the said Letters Patent should be read with this correction therein that the same may conform to the record of the case in the Patent Office.

Signed and sealed this 28th day of March, A. D. 1933.

(Seal)  Acting Commissioner of Patents.